July 31, 1934.  C. E. JOHNSON  1,968,400
PISTON RING CHUCK
Filed Dec. 18, 1933   2 Sheets-Sheet 1
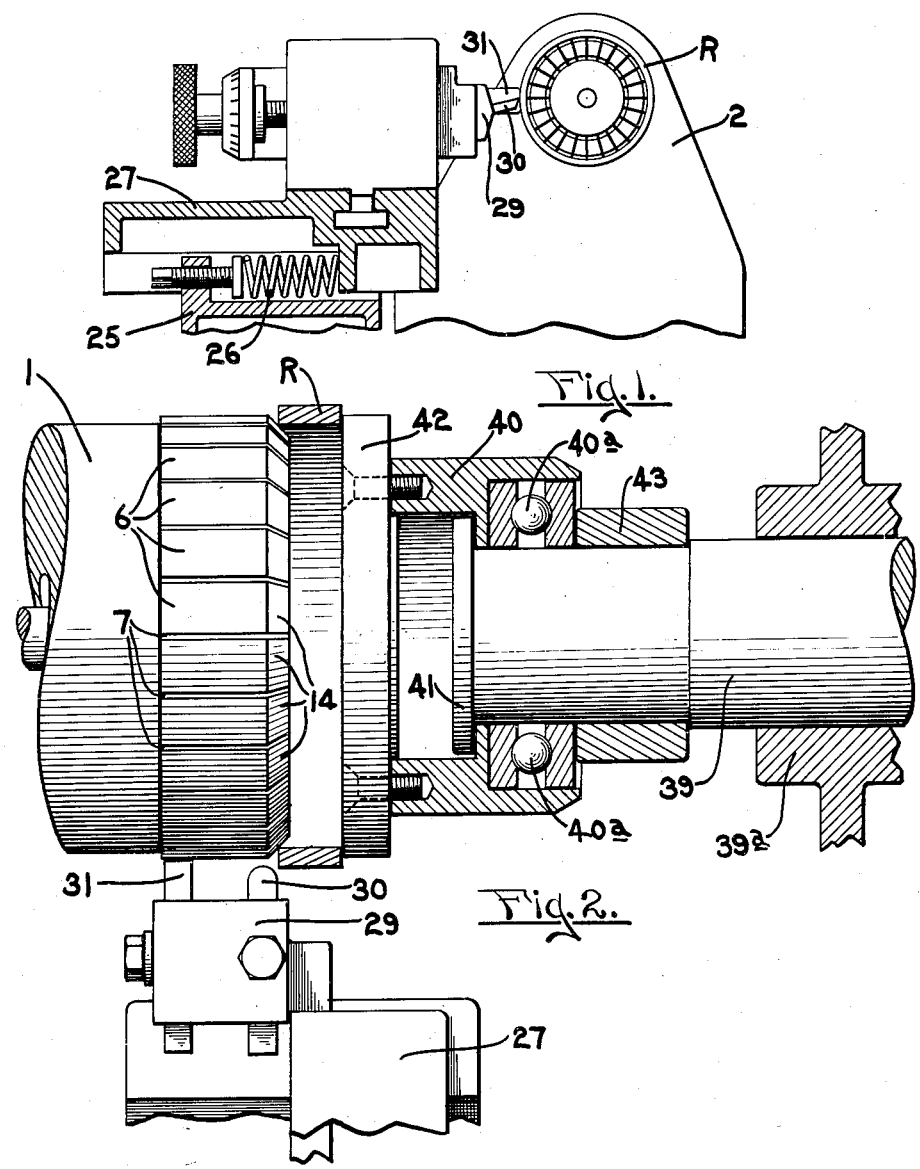
Inventor
Charles F. Johnson
By Livrance &
Van Antwerp
Attorneys July 31, 1934.  C. E. JOHNSON  1,968,400
PISTON RING CHUCK
Filed Dec. 18, 1933   2 Sheets-Sheet 2
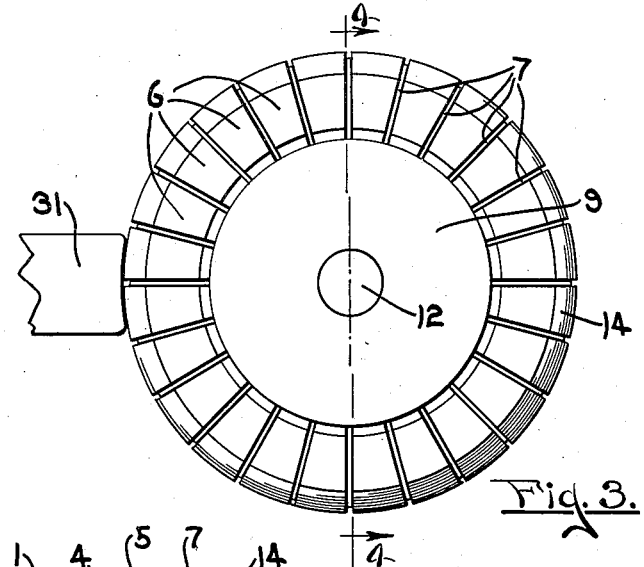
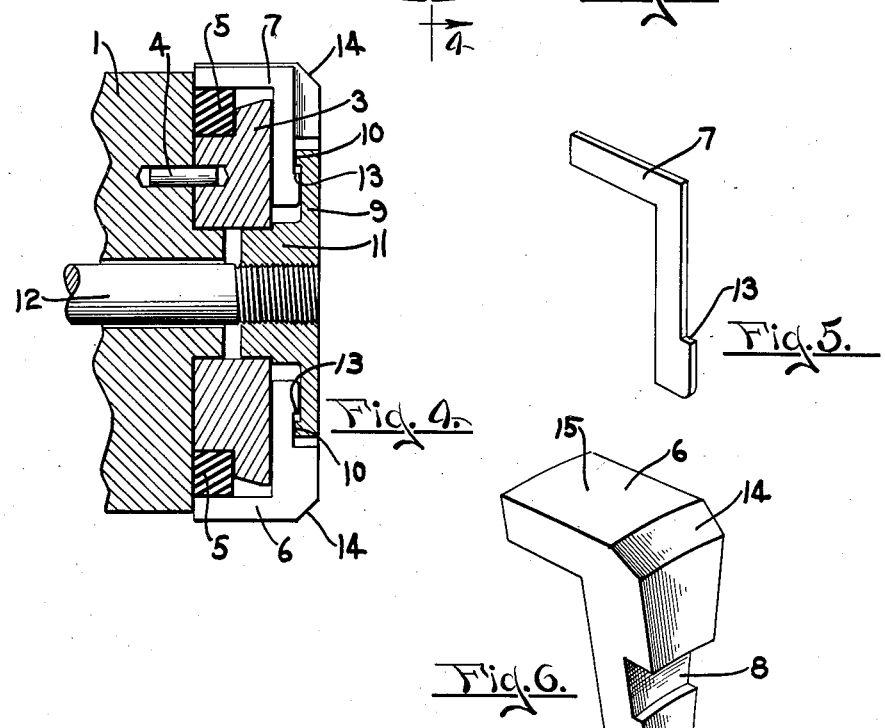
Inventor
Charles E. Johnson
By Liverance and
Van Antwerp
Attorneys Patented July 31, 1934

1,968,400

UNITED STATES PATENT OFFICE 1,968,400

PISTON RING CHUCK

Charles E. Johnson, North Muskegon, Mich., assignor to Sealed Power Corporation, Muskegon, Mich., a corporation of Michigan Application December 18, 1933, Serial No. 702,957

9 Claims. (Cl. 82—40)

This invention relates to piston ring chucks and more particularly to a flexible chuck which will conform itself to the irregularities of the ring clamped upon it. Furthermore, the chuck is provided with a cam surface which is also flexible and cooperates with the chuck to assume the same irregularity as the chuck assumes.

The chuck of this invention may be conveniently used in a piston ring lathe such as disclosed by my United States Patent 1,471,032 and is illustrated herein as applied to such a machine, parts of which are illustrated. It is to be understood, however, that the chuck embodying this invention is not limited to use with such a machine as disclosed by said patent nor is its use limited to piston rings.

In the manufacture of piston rings, a certain type of casting known as the "out of round" casting is commonly used which has certain advantages over the true circular casting and as a part of the machine operation the casting must be machined on its outer curved surface to remove the scale from the casting and the resultant machined surface should be out of round corresponding to the shape of the original casting and also corresponding to the shape of the inner curved surface of the ring. Although the deviation from a true circle in the out of round casting is not great and it is realized that the casting may be sprung out of its normal shape to some extent it has been found that it is impracticable to spring the casting to a true circular shape while being machined, especially in the wider variety of ring castings, and therefore it is preferable to provide a chuck which will conform itself to the shape of the casting and to provide a cam which will cause the lathe tool to follow the irregular shape of the out of round casting in making its cut on the outer surface thereof.

The accompanying drawings illustrate one embodiment of the invention, it being conceived that various modifications of structure thereof may be resorted to within the scope of the invention.

With reference to the accompanying drawings in which like reference numbers refer to like parts in all of the figures, Fig. 1 is an elevation of a portion of a lathe showing the chuck embodying this invention in place thereon and in end view.

Fig. 2 is an enlarged plan view of the chuck and associated parts of the lathe illustrating a ring clamp in place on the chuck.

Fig. 3 is an end view of the chuck.

Fig. 4 is an axial section of the chuck taken on the line 4—4 of Fig. 3.

Fig. 5 is a perspective view of one of the spacer elements of the chuck and

Fig. 6 is a perspective view of one of the segmental sections of the chuck.

The lathe on which the chuck embodying this invention is used has a spindle 1, one end of which is shown in Figs. 2 and 4, which spindle is rotatably mounted in a bearing on the frame 2 of the machine and is provided with conventional means (not shown) for rotating it.

The chuck embodying this invention comprises a hub 3 located against the end of the spindle 1 and preferably having means co-acting between the hub and spindle, such as a pin 4, to prevent relative rotation between the two members. A resilient ring 5, of material such as rubber, surrounds the hub 3. A plurality of chuck segments 6 alternately arranged with the spacers 7 are located around the hub 3 and the resilient ring 5 to form a substantially cylindrical chuck.

The inner ends of the segments 6 are grooved at 8 and a retaining disk 9 has an annular flange 10 which enters the grooves 8 and holds the segments 6 in place. The disk 9 has a hub 11 shouldered to engage the hub 3 and is clamped against the hub 3 by a bolt 12. The bolt 12 shown extends through the spindle 1 and is fastened to the spindle at its opposite end by suitable means (not shown). This bolt 12 may be of any suitable form and can constitute simply a screw or other fastening means which will attach the retaining disk 9 to the spindle 1 and at the same time hold the hub 3 against the end of the spindle.

The shoulder on the hub 11, which engages the hub 3, spaces the disk 9 away from the hub 3 sufficiently so that the segments 6 are permitted to move radially of the axis of the spindle and the grooves 8 are of sufficient width to permit such radial movement within a predetermined range. The inner ends of the spacers 7 are provided with shoulders 13 which lie inside of the flange 10 of the disk 9 and hold the spacers 7 in place.

The segments 6 and spacers 7 have portions extending parallel with the axis of the spindle 1 and portions extending inwardly toward the axis and the said parallel portions engage the resilient ring 5 while the inwardly extending portions slide between the hub 3 and the retaining disk 9 and serve as guide portions. The outer corner of each segment is beveled at 14. The beveled portions 14 of the segments serve as the gripping portions of the chuck against which the ring to be clamped is thrust and the outer surfaces 15 of the parallel portions of the segments serve as cam surfaces.

A thrust shaft 39 is provided in the lathe opposite the chuck and in alinement with the axis thereof and is mounted for reciprocation in a bearing 39a. The clamping head 42 is fixed to a sleeve 40 which is mounted by a ball bearing 40a on the thrust shaft 39. A collar 43 at one side of the bearing and a disk 41 hold these members in place so that the clamping head 42 is rotatable on the shaft 39.

The ring to be machined, which is indicated as R, is thrust against the beveled surfaces 14 of the chuck by the clamping head 42, the shaft 39 being moved toward the chuck for that purpose. When the ring is thrust against the beveled surfaces 14 the various segments 6 comprising the chuck move inwardly toward the axis in conformity with the shape of the inner surface of the ring which engages them, compressing the resilient ring 5 in so doing.

The limit of inward movement of the segments is reached when all of the segments and spacers therebetween are in close engagement with each other. In other words, the chuck may be compressed to a predetermined peripheral dimension but because it is comprised of a plurality of segments each movable relative to the other, the outer surface of the chuck does not have to be circular but may be caused to assume any irregularities of contour within the range of movements of the segments. Therefore, when the ring is thrust against the chuck the segments are moved inwardly and conform with the shape of the ring and inasmuch as the cam surfaces 15 are integral with the segments they are also moved to conform with the shape of the ring and produce a curved cam surface corresponding to the shape of the ring.

After the ring has been clamped on the chuck as described the lathe tool 30 is moved against the ring as it rotates to cut material from its outer curved surface. The lathe tool 30 is clamped in a tool holder 29 which is mounted on a slide 27 adapted to move toward or away from the ring. The slide is mounted on a carrier 25 and is pressed toward the ring by a spring 26. A cam rider 31 is mounted in the tool holder 29 adjacent the lathe tool 30 and in a position to engage and ride upon the cam surface 15 of the chuck segment. Therefore, as the clutch and ring rotate, the irregular contour of the cam surface of the clutch, which corresponds to the irregular shape of the ring, acting in conjunction with pressure of the spring 26, moves the slide 27 and also the lathe tool 30 toward and from the axis of the chuck as it rotates so that the lathe tool, in moving across a surface of the ring to perform its cutting action, finishes the outer surface of the ring in the same irregular shape as the inner surface thereof.

After the operation has been performed the clamping head 42 is moved away from the chuck releasing the ring and permitting it to be removed and also permitting the segments 6 to be moved outwardly by expansion of the resilient ring 5 in position to receive another ring to be operated upon.

The chuck structure has been illustrated and described as comprising a series of alternate segments and spacers. This form of structure has been used because of facility in manufacture. When made in this way a continuous ring is first formed which is then separated by sawing into a plurality of segments and when so made it is necessary to interpose the spacers 7 in the gaps formed where the saw cuts occurred, the spacers being of the same width as the saw cuts. It is, of course, possible to provide a series of segments of proper size so that when arranged together without spacers between them they will constitute a chuck of proper periphery.

The invention is defined in the appended claims and is to be considered comprehensive of all forms of structure coming within their scope.

I claim:

1. A flexible chuck having a surface against which an irregular shaped article is clamped, said chuck flexing to conform to the shape of the article clamped against it and a flexible cam surface operatively associated with said flexible chuck in a manner to automatically conform to the same shape into which the chuck is flexed.

2. A flexible chuck having a work engaging surface and a cam surface both normally assuming a substantially circular shape, means whereby both of said surfaces correspondingly change upon application of an irregular shaped object to said work engaging surface to correspond with the irregular shape of said object.

3. A flexible chuck comprising a rotatable body, a plurality of segments arranged on said body and movable laterally of the axis thereof, a work engaging surface and a cam surface on each of said segments, the segments acting when engaged by an irregular object on their work engaging surfaces to assume positions conforming with the irregular shape of said object whereby a cam surface of corresponding irregular shape is produced.

4. A flexible chuck comprising a rotatable body, a series of segments mounted on said body for movement laterally of the axis thereof, the arcs of said segments being such as to limit the inward movements thereof so that the chuck will have a predetermined minimum periphery, each of said segments having a work engaging surface and a cam surface and said segments being movable relative to each other in a manner to cause the segments and the cam surface thereon to assume a contour corresponding to the shape of an article engaged with said work engaging surfaces.

5. The elements in combination defined in claim 3, in which said work engaging surfaces are inclined relative to the axis of the chuck.

6. The elements in combination defined in claim 3 in which said work engaging surfaces are inclined relative to the axis of the chuck and yieldable means for moving said segments outwardly from said axis.

7. A flexible chuck having a surface against which an irregular shaped article is clamped, said chuck flexing to conform to the shape of the article clamped against it, a flexible cam surface, means operatively associating said chuck and said cam surface whereby said cam surface automatically conforms to the same shape to which the chuck is flexed.

8. A chuck of the class described comprising a work engaging surface against which an article to be worked is clamped, said chuck having a cam surface, means associating said work engaging surface and said cam surface whereby said cam surface automatically conforms to the shape of the article clamped against the chuck.

9. A chuck having work engaging segments, said segments cut from an original continuous ring of unvarying radii and said segments spaced from each other by spacers of thickness equal to the width of the cut in the original ring whereby said segments are positioned so that their radii are equal to that of the original ring.

CHARLES E. JOHNSON.